United States Patent

[11] 3,581,287

[72] Inventors Lawrence E. Greenspan
Thorntons Ferry;
Earl J. Whitaker, Nashua, both of, N.H.

[21] Appl. No. 798,034
[22] Filed Feb. 10, 1969
[45] Patented May 25, 1971
[73] Assignee Sanders Associates, Inc.
Nashue, N.H.

[54] APPARATUS FOR ALTERING COMPUTER MEMORY BY BIT, BYTE OR WORD
14 Claims, 3 Drawing Figs.

[52] U.S. Cl. .......... 340/172.5
[51] Int. Cl. .......... G11c 15/00
[50] Field of Search .......... 340/172.5; 235/157

[56] References Cited
UNITED STATES PATENTS

| | | | |
|---|---|---|---|
| 3,161,763 | 12/1964 | Glaser .......... | 235/157 |
| 3,251,037 | 5/1966 | Coil et al. .......... | 340/172.5 |
| 3,292,158 | 12/1966 | Schneberger .......... | 340/172.5 |
| 3,293,617 | 12/1966 | Cottet .......... | 340/172.5 |
| 3,316,538 | 4/1967 | Piloty et al. .......... | 340/172.5 |
| 3,331,056 | 7/1967 | Lethin et al. .......... | 340/172.5 |
| 3,351,915 | 11/1967 | Fought et al. .......... | 340/172.5 |
| 3,368,207 | 2/1968 | Beausoleil et al. .......... | 340/172.5 |

*Primary Examiner*—Paul J. Henon
*Assistant Examiner*—R. F. Chapuran
*Attorney*—Louis Etlinger

ABSTRACT: The assembly of individual bits, bytes or words into a 16-bit word is accomplished directly in a computer memory without the use of 16-bit buffer registers in the bit or byte data channels. As a bit, byte or word is received by an input computer channel, that bit, byte or word is stored in the addressed location of the computer memory. In particular, this is accomplished basically by reading the addressed word out of memory into a memory register, gating the new bit or byte into the appropriate stage or stages of the memory register without altering the other stages and writing the new word back into the same memory location.

INVENTORS
LAWRENCE E. GREENSPAN
EARL J. WHITAKER
BY
ATTORNEY

INVENTORS
LAWRENCE E. GREENSPAN
EARL J. WHITAKER
BY
ATTORNEY

APPARATUS FOR ALTERING COMPUTER MEMORY BY BIT, BYTE OR WORD

BACKGROUND OF THE INVENTION

1. Field of the Invention

The present invention relates generally to data processing devices, and more particularly, to means for reading bits, bytes or words directly into memory at the specified address location without altering bits, bytes or words contained in the other locations of that address.

2. Description of the Prior Art

One of such methods of the prior art is the use of programmed masking instructions to insert the new data into memory. This requires the use of additional memory space for each program instruction where bits of any memory word must be altered without changing the other bit locations of that word. The complexity of programming and the execution time are increased.

In another prior art device, input data is usually assembled into a full memory word, for example, 16 bits before being stored in memory. Serial bit data or parallel bit data is usually assembled in a buffer register of the input channel until a full memory word is received. For example, if a memory word is 16 bits, two 8-bit bytes or 16 serial bits would form a memory word and would not be transferred to memory until both bytes were received, or until 16 bits were received. Where it is desired to transfer information between an input device which transmits data in serial form and a computer memory, this requires that each channel contains a 16-bit buffer. In a data processor which is comprised of many channels, this would necessitate the use of many 16-bit registers, one for each channel. It is desirable, therefore, to use the minimum amount of storage locations in the registers, thereby providing a savings in logic elements.

It can be seen from the above, that the following limitations have been associated with the prior art, either singly or in combination in that they necessitate excessive programming instructions, thereby making the task of programming much more difficult, and they require a full word buffer register independent of the device being communicated with, thereby increasing the number of required logic elements.

SUMMARY AND OBJECTS OF THE INVENTION

Accordingly, it is an object of this invention to provide a means for altering the contents of memory by a bit, byte or word.

It is another object of this invention to alter the contents of memory by bit, byte or word without the need of buffering an entire memory word before that word is transferred to memory.

Still another object of this invention is to provide a means for altering the contents of a memory by characters comprised of a variable number of bits, without requiring additional programming instructions.

It is yet another object of this invention to provide a means for altering contents of memory by bit, byte or word without changing contents of memory at those locations not selected to be altered.

It is a further object of this invention to provide a means for altering the contents of memory directly from the input device without additional buffer storage elements, and without the requirement for additional programming.

Other objects of the invention will in part be obvious, and will in part appear hereinafter.

The invention accordingly comprises the features of construction, combination of elements, and arrangement of parts which will be exemplified in the construction hereinafter set forth and the scope of the invention will be indicated in the claims.

Briefly, assembly of individual bits of bytes of a 16-bit word is made in memory without the use of a 16-bit buffer register at the input buffer. As a bit or byte is received by a buffer, the bit or byte is stored in the addressed bit or byte location of the addressed memory word. This is accomplished basically by reading the addressed word out of memory into a memory register, gating the new bit or byte into the appropriate stage or stages of the memory register without altering the other stages and then writing the new word back into the same memory location.

Initially, a channel control word provides an address instruction which selects the memory word location to be addressed. The channel control word also provides indication of a byte location. When a byte is received, a byte location control signal will direct that byte into the upper or lower byte location of the two byte or 16-bit word. From that point, the next byte received will be transferred to the other byte location by a toggling arrangement of the byte location signal. When a bit is received, this bit will be transferred directly to memory at the addressed memory location and from that point will be transferred into successive bit locations until eight bits have been received at which point the byte toggling arrangement, as stated above, will function thereby directly storing bits in the next byte location until eight additional bits have been received. Therefore, upon the receipt of successive bits or bytes of information, and without the use of programming instructions, the bit or byte will be automatically stored in memory. When a word is received at the input channel, it will be gated directly into memory.

This above-mentioned arrangement is especially useful in that area of processing apparatus where communication over multiple channels is the requirement. When the processor is communicating with low speed devices, such as teletype, which transmit serial bit information, bit buffers are used in those channels. Where the processor is communicating with devices which transmit their information in byte form, such as paper tape, paper punch, printers, or reader and magnetic tape storage devices, then byte buffers are used in those channels. These byte buffers may be comprised of different bit lengths. When the processor is communicating with a high speed device such as another processor or disc file, then the channel would include a word buffer. In communicating with all of these devices, it is therefore necessary that in certain cases, the memory be alterable by bit, byte or word and in altering this memory by bit or byte, it is important not to change the other bits or bytes in that word location. Thus, it can be seen that the apparatus of this invention minimizes the storage requirements necessary to alter a word location in memory and accomplishes this with a minimum of programming and logic elements.

BRIEF DESCRIPTION OF THE DRAWINGS

The foregoing and other objects, features and advantages of the invention will be apparent from the more particular description of preferred embodiments of the invention as illustrated in the accompanying drawing in which.

DESCRIPTION OF THE PREFERRED EMBODIMENTS

Figure 1B:
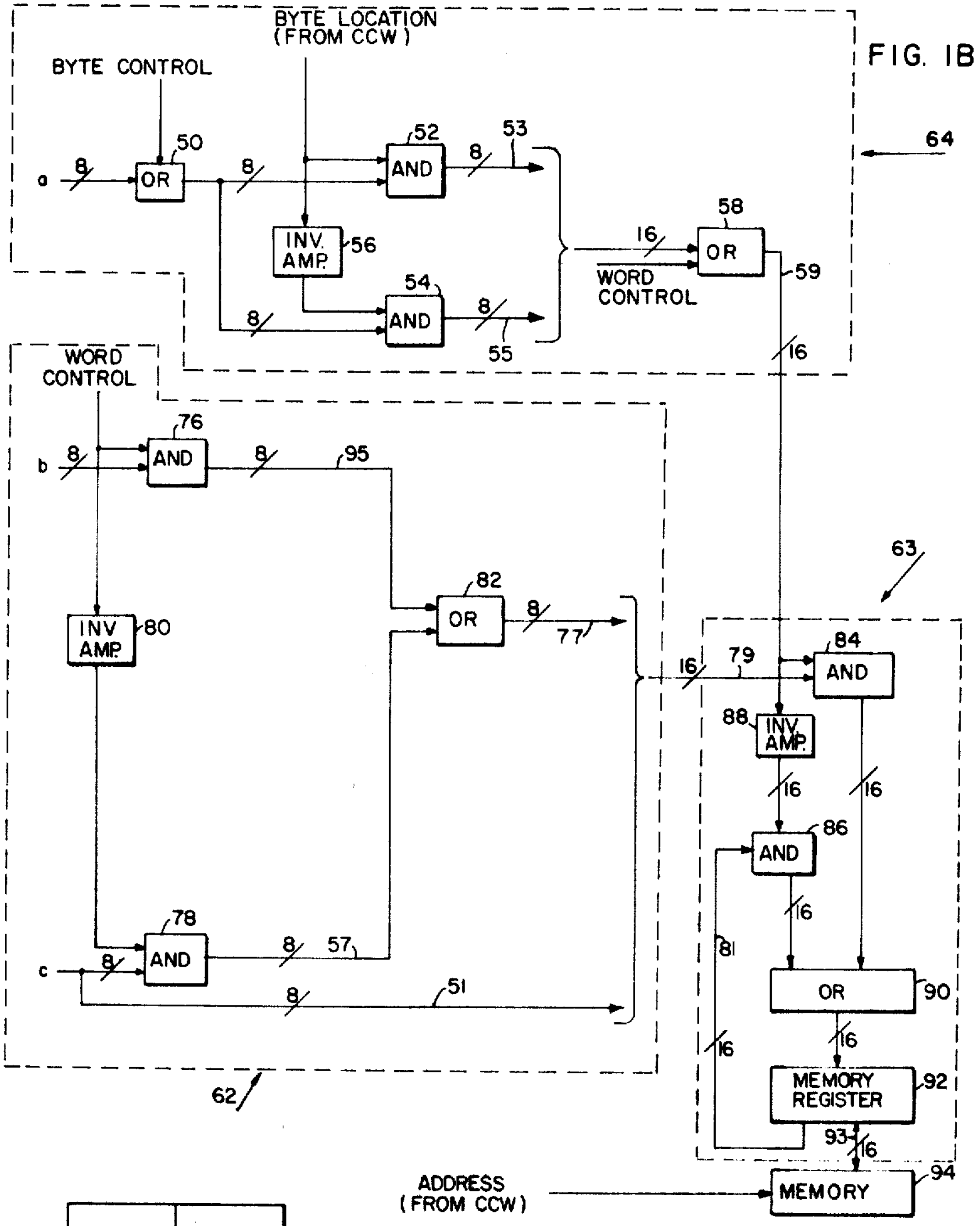
FIGS. 1A and 1B are a schematic diagram of memory altering apparatus embodying the invention.
Figure 1:
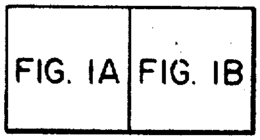
FIG. 1 is a composite view showing the arrangement for FIGS. 1A and 1B.
Figure 1A:
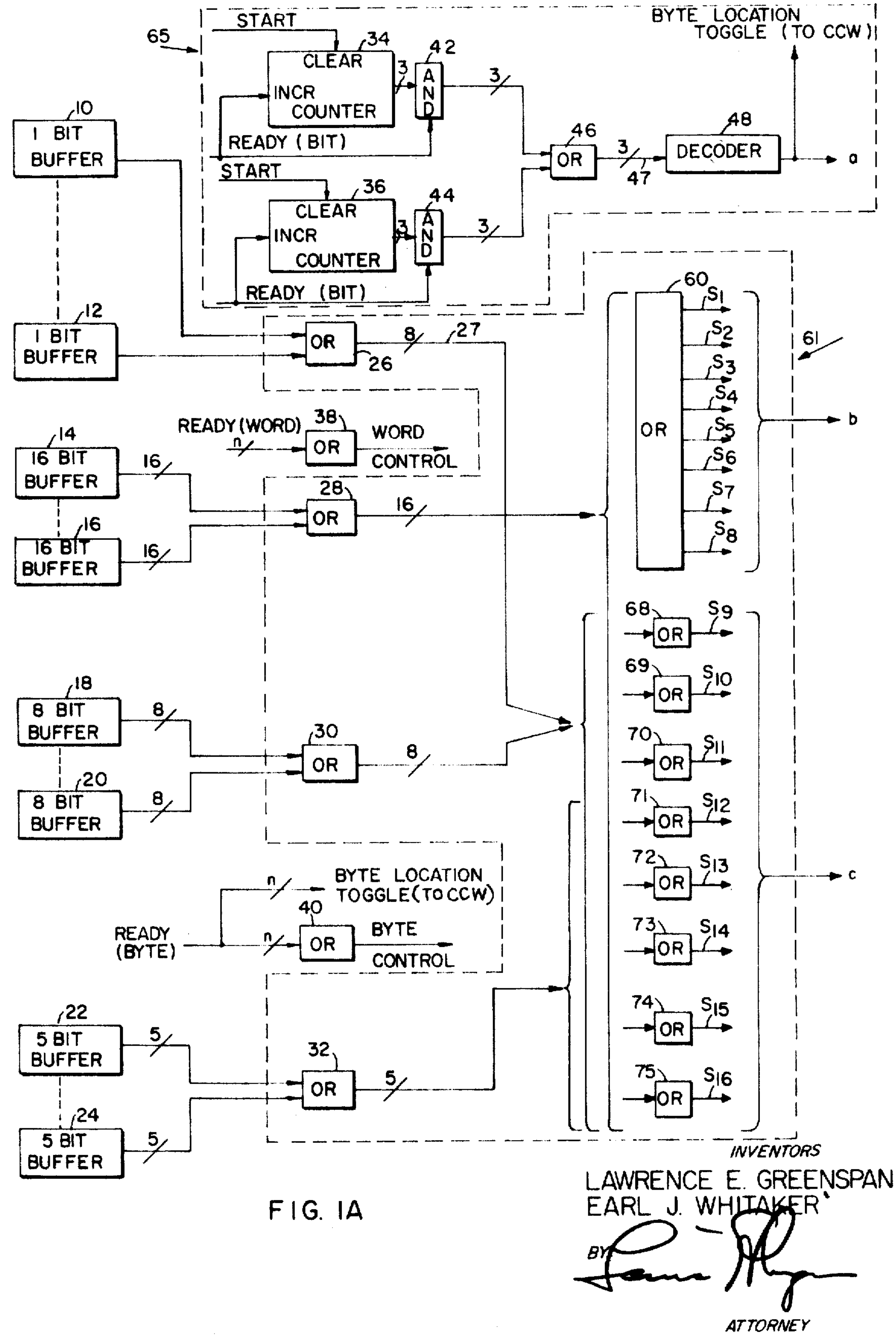

Referring to the FIGS. 1A and 1B, for simplicity of illustration, there have been shown multiple OR gates, AND gates and inverting amplifiers. Where multiple lines are connected between these different logic elements the number of lines is indicated by a slash and number. The number of gates or amplifiers is equivalent to the number of these connecting lines.

In further explanation, a Channel Control Word (CCW), which will be referred to, is a means for controlling data transfer in the input channels between the buffers and memory. There is one Channel Control Word associated with each buffer and all Channel Control Words are stored in a channel array, not shown. When a channel is ready for data transfer, the Channel Control Word is addressed, and is stored in a register, not shown. This Channel Control Word contains the address of the memory location used in the input operation and a byte location bit specifying which half of the 16-bit memory word is being addressed. This byte location bit may be toggled in the register in which it is stored by means to be discussed.

Still referring to the FIGS. 1A and 1B, there is illustrated a gating structure used to transfer data received on an input channel into memory. Basically, all data inputs to the various buffers are funnelled into any of 16-bit lines $S_1$ to $S_{16}$ by means of a buffer steering logic section 61. These 16-bit lines are routed into a bit steering logic section 62, which section 62 channels the 16-bit lines into a byte array or a word array depending upon a signal generated by the presence of a word on a 16-bit word buffer channel. In further explanation, when a word is present on the 16-bit lines, the word is routed through the bit steering logic section 62 parallel until the word is now contained on the data lines 79. When a byte is present, it is routed so as to appear on both the upper byte lines and lower byte lines of lines 79.

The output of the bit steering logic section 62 contained on lines 79 is coupled to a memory steering logic section 63 as is the byte control logic section 64. First explaining the byte control logic section 64, when a byte is received and temporarily stored at a byte buffer channel an upper or lower control byte is generated on either lines 53 or 55 depending upon the toggled byte location signal from the Channel Control Word. The byte signal then appears on respective ones of lines 59. Where a bit is received on a bit buffer channel, and is encoded by the bit assembly logic section 65, a bit control signal is generated on one of the 16 lines of lines 53 and 55 depending upon the position of the received bit as encoded by the bit assembly logic section 65 and upon the toggled byte location signal from the Channel Control Word. The bit signal then appears on the respective bit line of lines 59. When a word is received at the 16-bit word buffer, each of lines 59 has an active signal, thereby designating the ready presence of a word.

The lines 59 being the output of the byte control logic section 64 and the lines 79 being the output of the bit steering logic section 62 combine to control the transfer of data to memory 94, which control is provided in a memory steering logic section 63.

When memory 94 is addressed, the contents at that address are temporarily stored in a register 92 in section 63. The contents of register 92 are made available at the input of AND gates 86 which is controlled by the byte control logic section 64. If a word is to be transferred into memory 94, the original data will be inhibited by the AND gates 86 and the new word will be stored in the just addressed memory location. This completes the typically known read/write memory cycle for the word transfer. When a byte is to be transferred, the selected byte signal from section 64 will inhibit only the respective byte AND gates of AND gates 86 such that the new byte will be stored in memory 94 simultaneously with the unaltered original byte. In a similar manner, where a bit is received in a bit buffer, the selected control signal from sections 64 and 65, corresponding to the position in a word of the bit received and the byte location signal, will inhibit the corresponding AND gate of AND gates 86 such that the new bit will be stored in memory 94 simultaneously with the other 15 original bits.

As indicated above, each channel may include a bit, byte or word buffer, illustrated as buffers 10, 12, 14, 16, 18, 20, 22 and 24. It should be noted that the byte buffer may include any plurality of bits, the sole Figure, for example, illustrates 5 and 8-bit buffers. The word buffer may include two or more bytes; i.e., the word size may be divided into any number of bytes. As indicated, the word buffer used has a storage capability of 16 bits. However, this is by way of example only, and should not be construed in a limiting sense.

Data from the various buffers are routed into lines $S_1$ to $S_{16}$ by means of the buffer steering logic section 61 as will now be discussed. Single data bit outputs from bit buffers 10 and 12 are passed through OR gate 26 and applied to lines $S_9$ to $S_{16}$ through OR gates 68 to 75. All character buffers containing the same number of bits in a byte, for example, buffers 18 and 20 each containing 8 bits in a byte, and buffers 22 and 24 each containing five bits in a byte, or ORed together to form a single set of 8-bit outputs via OR gates 30, and 5-bit outputs via OR gates 32. These 8-bit and 5-bit outputs are applied to lines $S_9$ to $S_{16}$ via OR gates 68 to 75 and $S_{12}$ to $S_{16}$ via OR gates 71 to 75 respectively. The outputs from all 16-bit word buffers 14 and 16 are similarly ORed together in OR gates 28 and applied to line $S_1$ to $S_{16}$ via OR gates 60, containing eight OR gates, and OR gates 68 to 75.

In summary, it can, therefore, be seen that the resulting data on lines $S_1$ to $S_{16}$ is as follows:

Single bit – $S_9$ to $S_{16}$
5-bit byte – $S_{12}$ to $S_{16}$
6-bit byte – $S_{11}$ to $S_{16}$
7-bit byte – $S_{10}$ to $S_{16}$
8-bit byte – $S_9$ to $S_{16}$
16-bit word – $S_1$ to $S_{16}$ Now, we shall describe the operation of the system when a 16-bit word, a byte and a bit are to be transferred to memory 94. First to be described is the transfer of a 16-bit word directly from an input channel to memory. The ready signals, one for each channel, indicate that a buffer is ready to transfer a word to memory. The ready signals from all the 16-bit word buffers are ORed together in OR gate 38 to form a *word control* signal. Therefore, whenever a 16-bit word is ready for a data transfer, the word control signal goes to a logical one, and in bit steering logic section 62 activates AND gates 76 and steers data on lines $S_1$ to $S_8$ onto data input lines 77 via OR gates 82. Data on lines $S_9$ to $S_{16}$ will appear on lines 51 directly. The word control signal also activates OR gates 58, generating gating signals on lines 59. The original data contained in the addressed word location of memory 94 is placed in register 92 during the memory read cycle and is available at the input of AND gates 86 of the memory steering logic section 63. However, this original data is inhibited since control signals from lines 59 at the output of byte control logic section 64 condition AND gates 84 and not AND gates 86. Since the gating signals on lines 59 activate AND gates 84, this allows the data on lines 79 to pass through OR gates 90 into memory register 92 and into memory 94 via lines 93 during the memory write cycle. The original data is thus altered by a full word.

When a byte buffer is ready for a data transfer from either of the 5- or 8-bit buffers, the following sequence occurs. The word control signal which is now a logical zero, and which is inverted via inverting amplifier 80 in bit steering logic section 62, activates AND gates 78 and causes the data on lines $S_9$ to $S_{16}$ to appear on lines 77 via OR gates 82. The data on lines $S_9$ to $S_{16}$ also appears on lines 51 via a direct connection. The ready signals from all of the byte buffers are ORed in OR gate 40 to produce a *byte control* signal. When the byte control signal is a logical one and the input channel containing a byte buffer has been selected for data transfer, the *byte location* bit of the active Channel Control Word specifies which half of the 16-bit memory word will receive the new byte or character. The ready signals are also used to toggle the byte location bit in the Channel Control Word.

The byte location bit is either under program control or is toggled as has been discussed. If the byte location bit is a logical one, this specifies that the data will be received in bit locations 1 to 8. Conversely, if the byte location bit is a zero, the character will be received in bit locations 9 to 16.

When the byte control signal is a logical one, OR gates 50 in byte control logic section 64 will each have a logical one at its output. If the byte location bit is also a logical one, AND gates 52 are fully conditioned generating gating signals on lines 53, which in turn activate, via OR gates 58, the first eight lines of lines 59. The second eight lines will be inactive; i.e., logical zeros. Note that lines 59 are comprised of 16 parallel lines and that the least significant lines are the lines referred to presently. The first eight lines of lines 59 enable AND gates 84 which gate the data input lines 77 into the first eight memory locations of memory register 92 via OR gates 90. The lines 59 are also inverted by inverting amplifiers 88 such that the second eight lines of lines 59 enable AND gates 86 to gate original memory data into the upper or second eight bits of memory register 92 via OR gates 90. Thus, the data originally contained in the second eight bits of memory 94 is transferred into the second or upper eight bits of memory register 92, gated in AND gates 86 and stored back into memory register 92 and finally memory 94. That is, because the second eight bits of lines 59 are logical zeros and inverted by inverting amplifiers 88, the second eight AND gates 86 are fully conditioned, thereby passing original memory data back into register 92. As a result, the new data byte is inserted in bits 1 to 8 of memory 94, and bits 9 to 16 of memory 94 are left unchanged. Hence, during a read-write memory cycle, original memory data will be restored in each bit position where control lines 59 are a logical zero and conversely, new data is stored in each bit position where lines 59 are logical ones.

If the byte location bit had been a logical zero, the lines 55 in byte control logic section 64 would have been activated since inverting amplifier 56 would have had a logical one at its output and would fully condition AND gates 54. Thus, the first 8 bits of lines 59 would have been logical zeros, and the second 8 bits would have been logical ones. Accordingly, the new byte would have been inserted in bit locations 9 to 16 of memory, leaving bits 1 to 8 unchanged.

When it is desired to transfer a single bit to memory, a bit buffer ready line will be activated on receipt of the single bit by a 1-bit buffer. A single bit coming from either bit buffer 10 or bit buffer 12 will be ORed through OR gate 26 and will appear on all eight lines 27, and through OR gates 68 to 75 on data lines $S_9$ to $S_{16}$ of buffer steering logic section 61. Since we are now transferring a bit, the word control signal will be a logical zero. Because of this AND gates 78 in bit steering logic section 62 will be partially conditioned by the word control signal via inverting amplifier 80. AND gates 78 will be fully conditioned by the occurrence of signals on lines $S_9$ to $S_{16}$. The output of AND gates 78 will be present on lines 57 and be transferred to lines 77 via OR gates 82. Also, the data on lines $S_9$ to $S_{16}$ will appear directly on lines 51. Therefore, a single bit now appears on all lines 77 and 51 which, in turn, are connected to all 16-bit lines 79.

To gate the appropriate bit line of lines 79 into memory 94, a three-stage bit counter is utilized in combination with each bit buffer. When bit buffer 10 is ready to transfer its bit, the ready signal will partially condition AND gates 42 in bit assembly logic section 65. The ready signal will also increment counter 34. This counter contains the address of the bit within one of the two 8-bit bytes of each memory word. If the address of counter 34 is a logical 000, this specifies bit number 1 or 9. Whereas, if the counter address is logical 111, this specifies 8 or 16. As before, the byte location signal 110 the word byte address at which the data will be stored.

The counter outputs from all bit buffers are ORed together in OR gate 46, and the common 3-bit output on lines 47 is applied to a standard three by eight decoder 48. The active decoder output activates one of the eight OR gates 50 in byte control logic section 64. In one example, if this is the first bit which has been received by bit buffer 10, and counter 34 had been cleared by a start signal, the first bit is decoded by decoder 48 to be on the first or least significant line so that the decoder 48 output is a logical 000. In addition, if the byte location signal is a logical one, this specifies that the bit received will be transferred to bit position one of the addressed memory word. The bit so received is gated into memory 94 as follows. The least significant or first bit position AND gate of AND gates 52 is fully conditioned by the received bit and the byte location signal from the Channel Control Word, thereby presenting a logical one on the first line of lines 53. This logical one level is transferred to the first line of lines 59 via OR gates 58. The first AND gate of AND gates 84 of the memory steering logic section 63 is fully conditioned by this logical one level and the received data bit on the first of lines 79, at the output of bit steering logic section 62, thereby passing the new data bit via OR gates 90 to the first position of register 92 and, thereafter, memory 94. The remaining 15 positions of the addressed memory word of memory 94 remain unaltered since the respective 15 gates of AND gates 86 are conditioned to pass the original memory data in the upper 15 positions back into memory 94 unaltered.

The operation is similar for the next received bit, except that counter 34 has been incremented one position and decoder 48 activates the next or second bit line of lines 59, thereby effecting a bit transfer into memory 94 at the second bit position only, leaving bits 1 and 3 to 16 unaltered. The eighth received bit is processed in a similar manner until it is transferred into memory 94 after which decoder 48 outputs a signal to toggle the byte location signal. Counter 34 recycles to the first position on the receipt of the next bit. The next 8 bits received in the channel containing single bit buffer 10 are transferred to positions 9 to 16 of the addressed memory word.

It should be understood that in the examples mentioned above for altering memory by bit, byte or word, that the address of the word being so altered is incremented to the next word when such first addressed memory word receives its full capacity of bits or bytes or upon receipt of a word. This increment capability is provided in the Channel Control Word register, not shown.

The apparatus described hereinabove has been said to be capable of altering memory by data received on an input channel in such a manner as to alter that memory by bit, byte or word without altering the remaining contents of the addressed memory location. In a similar manner, it can be shown that this apparatus may be used in the output channel of a data processing system, in the transmission of data to peripheral devices. The organization for such an input/output channel arrangement for a data processing system is the subject of our copending application filed concurrently herewith, and entitled "Input/Output Channel Organization of A Data Processing System," and assigned to the assignee of the present application.

In such an output configuration, words from memory would be transferred to a 16-bit word output buffer in a reverse manner, as described hereinabove. A byte will be transferred from memory upon address from the channel control word as directed by the output peripheral device and the byte location signal. Likewise, a similar byte control logic section 64 and logic as described hereinabove would be utilized in a reverse manner. Similarly, the bit assembly logic section now under output peripheral device control will address that bit to be transferred from memory to the peripheral device and utilizing similar logic as described hereinabove would transfer the data bit to the bit output buffer, and in turn, to the output peripheral device.

It will thus be seen that the objects set forth above, among those made apparent from the preceding description, are efficiently attained and since certain changes may be made without departing from the scope of the invention, it is intended that all matter should be interpreted as illustrative, and not in a limiting sense.

Having described the invention, what we claim as new and secured by Letters Patent is:

1. Data processing apparatus comprising

A. a memory having a plurality of word storage locations, where a word includes a plurality of bytes and a byte is composed of a plurality of bits such that there are N bits in a word;

B. a data register adapted to store a data word;

C. buffer means adapted to receive a data quantity of bit, byte or word size;

D. means for addressing a memory word storage location;

E. N transfer leads for loading the data word stored at said addressed location in said register;

F. means responsive to each received data quantity to produce bit, byte or word control signals according to the size of the received quantity corresponding to the position thereof in a data word; and G. means for altering said loaded data word including a gating network selectively enabled by said control signals to route the received data quantities from said buffer means to their corresponding positions of said loaded data word without altering any bit positions which remain.

2. Apparatus as set forth in claim 1 wherein said buffer means includes at least one single bit buffer for receiving serial sequences of bits, at least one byte buffer for receiving bytes and at least one word buffer or receiving words, said bit, byte and word sized data being received via separate data channels.

3. Apparatus as set forth in claim 2 wherein said altering means includes

A. N data lines apportioned into at least first and second byte groups;

B. means coupled to said single bit buffer for assembling a received bit on each of the bit lines of said first byte group;

C. means coupled to said first byte group lines and conditioned by the absence of a word size control signal for assembling said received bit on all of said second byte group lines; and D. means coupling said N data lines to separate bit locations of said register.

4. The invention according to claim 3 wherein said data assembling means further includes:

A. means coupled to said byte buffer for transferring a received byte to the bit lines of said first byte group; and B. means coupled to said first byte group lines and conditioned by the absence of a word size control signal for assembling the bits of said received byte on to said second byte group lines wherein said received byte appears on each of said first and second byte group lines.

5. The invention according to claim 4 wherein said data assembly means further includes:

A. means coupled to said word buffer for transferring a first byte of a received word to said first byte group lines;

B. means coupled to said word buffer for transferring a second byte of a received word to a third group of bit lines;

C. means coupling said third group of lines to said second byte group of lines when conditioned by the presence of a word size control signal.

6. Data processing apparatus as set forth in claim 3 wherein said means for producing control signals includes:

A. a counter coupled to said single bit buffer for counting each bit in a received serial sequence;

B. a decoder coupled to said counter for 1. decoding the count of said counter, 2. producing a first byte location signal when the counter has counted enough bits to constitute a byte, and 3. alternately, producing a second byte location signal every other time that the counter has counted enough bits to constitute a byte; and wherein said control signal producing means is coupled to said decoder so as to generate said bit control signal indicative of the position of the received bit.

7. Data processing apparatus as defined in claim 6 wherein said data assembling means further includes;

A. means coupled to said byte buffer for transferring a received byte to the bit lines of said first byte group; and B. means coupled to said first byte group lines and conditioned by the absence of a word size control signal for assembling the bits of said received byte on to said second byte group lines wherein said received byte appears on each of said first and second byte group lines.

8. The invention as defined in claim 7 wherein said data assembly means further includes:

A. means coupled to said word buffer for transferring a first byte of a received word to said first byte group lines;

B. means coupled to said word buffer for transferring a second byte of a received word to a third group of bit lines;

C. means coupling said third group of lines to said second byte group of lines when conditioned by the presence of a word size control signal.

9. Data processing apparatus, comprising

A. a memory having a plurality of word storage locations, where a word includes a plurality of bytes and a byte is composed of a plurality of bits such that there are N bits in a word;

B. a data register adapted to store a data word;

C. a bit buffer for receiving a serial sequence of bits;

D. means for addressing a memory word storage location;

E. N transfer leads for loading the data word stored at said addressed location in said register;

F. means responsive to each received bit for generating a bit control signal corresponding to the position of each received bit in a data word;

G. N data lines and means coupled to said bit buffer for placing each received bit on all of said data lines; and H. means for altering said loaded word including gating means selectively enabled by each bit control signal to transfer each received bit to the corresponding bit position of said loaded word from a corresponding one of said data lines without altering the remainder of said loaded word.

10. A system as defined in claim 9 wherein the remaining bits of said loaded word are unaltered by said gating means.

11. A system as defined in claim 10 wherein said generating means includes:

A. means, coupled to said bit buffer for sequentially counting the received bits;

B. means for detecting the receipt of a plurality of bits, said 5 plurality of bits forming a byte, and generating a byte location signal indicative of the byte location in said loaded word; and C. means for gating said byte location signal and the count of said counting means to produce said bit control signal indicative of the bit position of said received bit.

12. A data processing system as defined in claim 11 wherein said counting means is recycled after each byte is received.

13. A data processing system as defined in claim 11 further including:

A. at least one byte buffer 1. adapted to receive a byte of data, and 2. responsive to said received byte, for generating a byte control signal indicative of the position of said byte in said loaded word;

B. means, connected to said byte buffer, for placing said received byte on said data lines; and C. wherein said gating means is selectively enabled by said byte control signal to transfer said received byte from said data lines to a corresponding byte location of said loaded word.

14. A data processing system as defined in claim 11 further including:

A. at least one word buffer adapted to receive a word of data;

B. means, responsive to said received word, for generating a word control signal;

C. means, connected to said word buffer, for placing said received word on said data lines; and D. wherein said gating means responds to the absence of bit and byte control signals to load said received word into said data register.